United States Patent [19]

Giebel et al.

[11] Patent Number: 5,408,985
[45] Date of Patent: Apr. 25, 1995

[54] GAS TANK RETAINER

[75] Inventors: Michael Giebel, Joplin; Steven Speck; Randy A. Love, both of Neosho, all of Mo.

[73] Assignee: Sunbeam Corporation, Fort Lauderdale, Fla.

[21] Appl. No.: 290,069

[22] Filed: Aug. 15, 1994

[51] Int. Cl.6 .................................................. F24C 3/00
[52] U.S. Cl. ................................. 126/41 R; 126/9 R; 126/276
[58] Field of Search ............... 126/41 R, 40, 50, 25 R, 126/38, 39 R, 276, 39 B, 9 R, 9 B, 24; 99/357, 339, 340, 449, 422, 425; 431/344, 343

[56] References Cited

U.S. PATENT DOCUMENTS

| 4,356,988 | 11/1982 | McIntosh | 126/41 R |
| 4,677,964 | 7/1987 | Lohmeyer et al. | 126/41 R |
| 4,886,045 | 12/1989 | Ducate, Jr. et al. | 126/41 R |
| 4,984,515 | 1/1991 | Pivonka | 126/50 |
| 5,076,257 | 12/1991 | Raymer et al. | 126/41 R |
| 5,140,973 | 8/1992 | Home | 126/41 R |
| 5,237,912 | 8/1993 | Fins | 126/41 R |

Primary Examiner—James C. Yeung
Attorney, Agent, or Firm—Michael J. Kline

[57] ABSTRACT

A gas tank retainer for a barbecue grill. The retainer allows the gas tank to be positioned in a recessed relationship with respect to the lower shelf of the grill. The lower shelf is spaced a predetermined distance from the underside of the grill, such that the gas tank cannot be stored vertically beneath the grill, creating a potential fire hazard, rather must be stored in the recessed portion designed for holding the tank.

9 Claims, 4 Drawing Sheets

GAS TANK RETAINER

FIELD OF THE INVENTION

The present invention relates to outdoor gas barbecue grills, and more particularly relates to devices for retaining gas tanks, such as propane tanks, on said gas barbecue grills.

BACKGROUND OF THE INVENTION

It is known in the prior art of outdoor gas barbecue grills to store a fuel tank on a base beneath the grilling surface. See, for example, U.S. Pat. No. 5,076,257 (FIG. 11). Such storage methods can cause problems, particularly when it is desired to move the grill on wheels or rollers to a different location. As the grill is moved, the tank may shift, stressing the fuel supply lines and fittings, potentially resulting in a fuel leak and consequent fire hazard. Additionally, it is not uncommon for users of an outdoor gas grill to store one or more spare fuel tanks on the base beneath the grilling surface, creating additional fire hazards, given the proximity of the heat source to the fuel tank(s) stored below.

Accordingly, an advance in the art could be realized if an improved fuel tank storage system for barbecue grills could be provided.

SUMMARY OF THE INVENTION

It is an object of the present invention to provide a fuel tank storage system for an outdoor barbecue grill that precludes a user of the grill from storing the fuel tank directly beneath the heat source for the grill.

It is a further object of the present invention to provide a fuel tank storage system that precludes a user of an outdoor barbecue grill from storing multiple tanks beneath the heat source for the grill.

It is yet another object of the invention to provide a device for retaining a fuel tank in a recessed storage position with respect to the base of the grill.

These and other objects of the present invention will become more readily apparent as the following detailed description of the preferred embodiments proceeds, particularly with respect to the drawings.

According to a highly preferred embodiment of the invention, a gas barbecue grill comprising an upper grilling portion supported by three or more legs is provided, the legs having positioned generally between them a lower shelf member spaced a predetermined distance from the underside of the upper grilling portion. The lower shelf member preferably includes a cutout portion sized and shaped for receiving a gas tank to be mounted to the grill for use therewith, the gas tank having a vertical height greater than the predetermined distance between the lower shelf member and the underside of the upper grilling portion. In this way, a user of the grill is precluded from placing the gas tank on the shelf member in a vertical orientation, rather must place the tank within the cutout portion designed for retaining the tank. The grill further includes a retaining device for retaining the gas tank in a recessed storage position with respect to the shelf member and within the cutout portion of the shelf member.

DETAILED DESCRIPTION OF THE PREFERRED EMBODIMENTS

Figure 1:
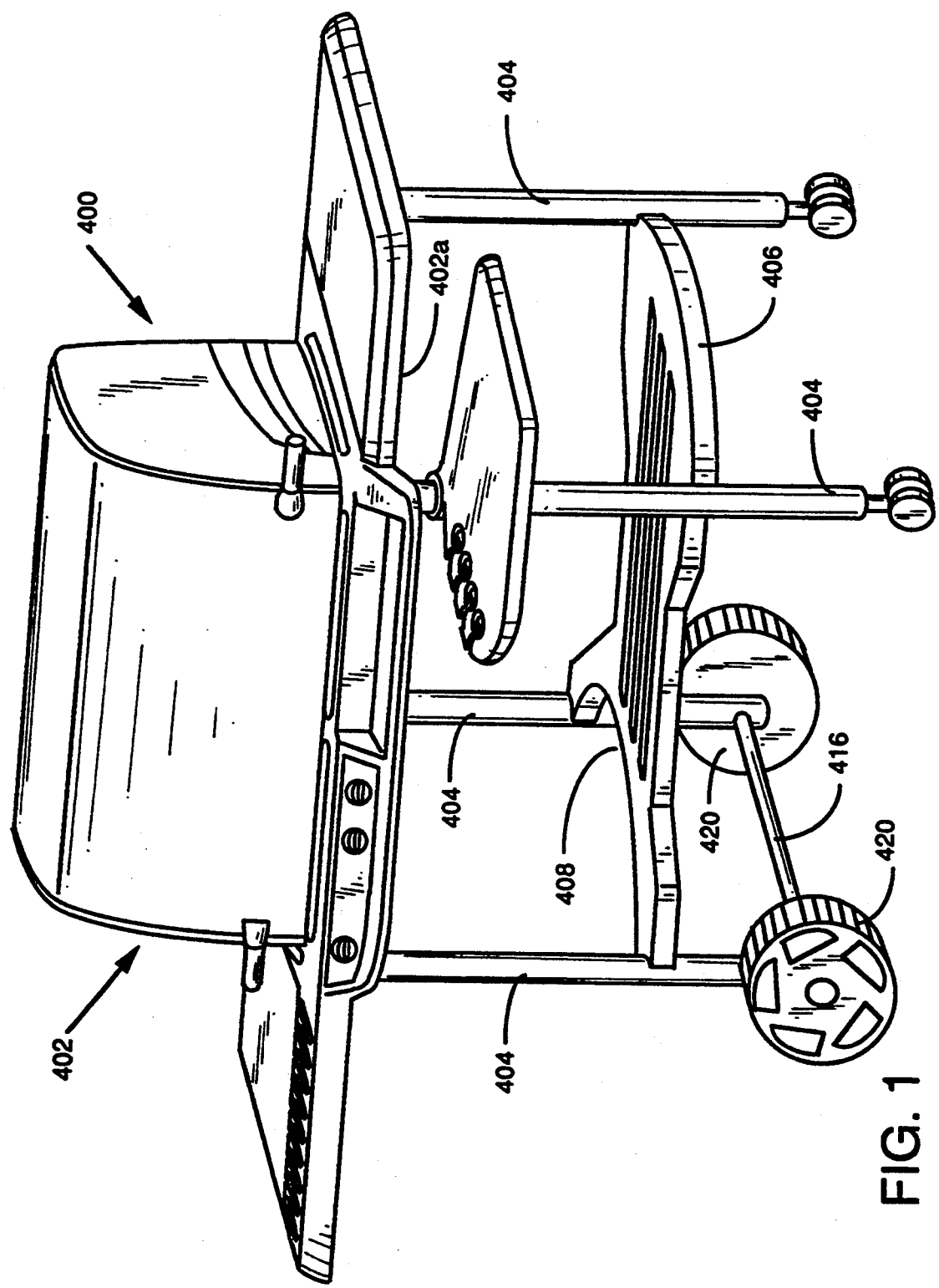
FIG. 1 is a generally perspective view of a grill comprising one embodiment of the present invention.

A highly preferred embodiment of the invention includes a gas tank retainer for retaining a gas tank in relationship to the grill. In this embodiment of the invention, illustrated in FIGS. 1–5, a grill, generally 400, includes an upper grilling portion, generally 402, supported by a plurality of legs 404. In the embodiment of FIG. 1, the upper grilling portion 402 is supported by four legs 404; however, as will be readily appreciated by those of ordinary skill in the art, as three legs define a plane, it would be feasible to support a grill using three legs, four, or more, as is well known to those of ordinary skill in the art.

Figure 2:
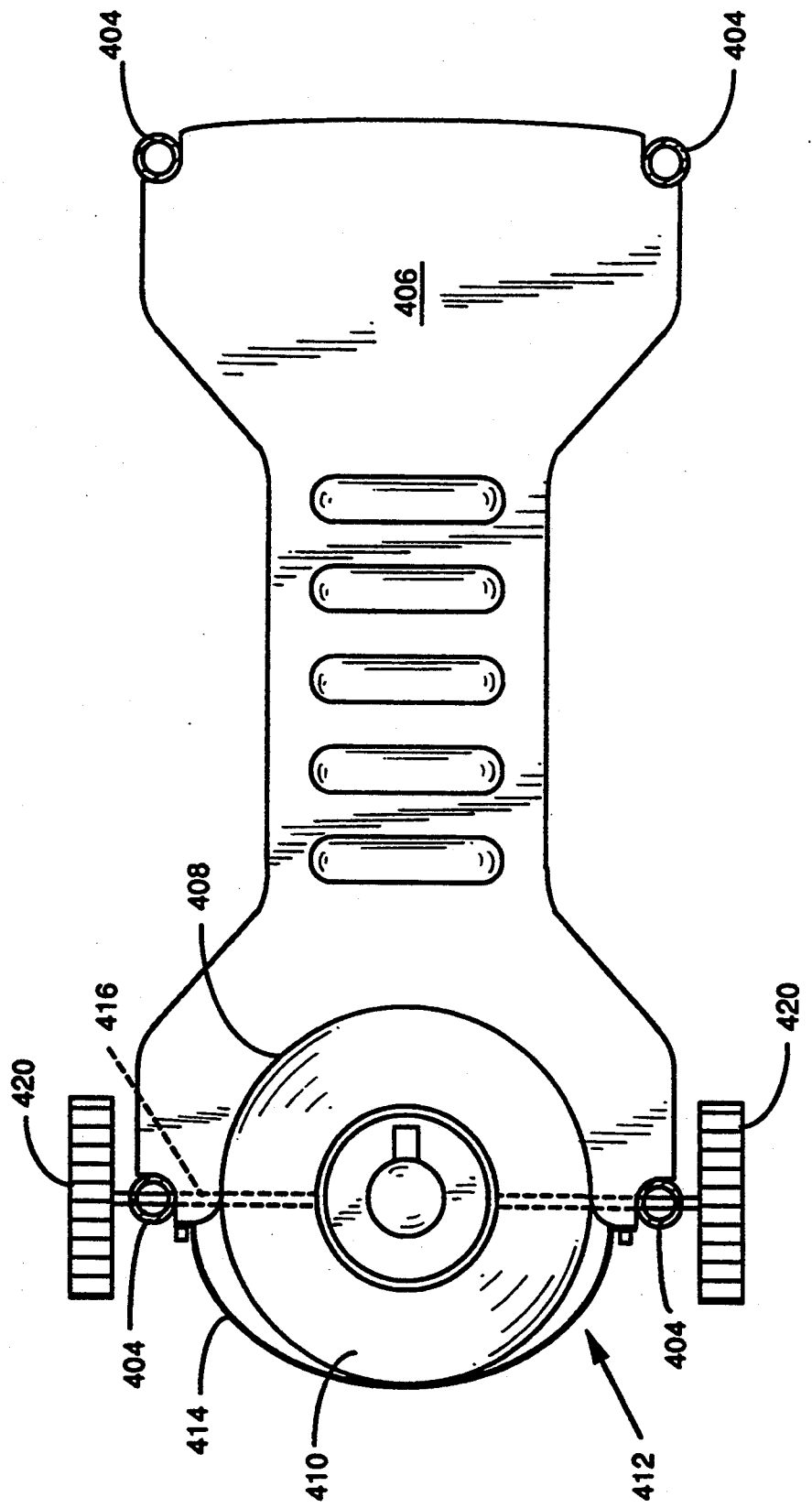
FIG. 2 is an elevational partial cross sectional view of a portion of a grill illustrating a preferred embodiment of the invention.
Figure 3:
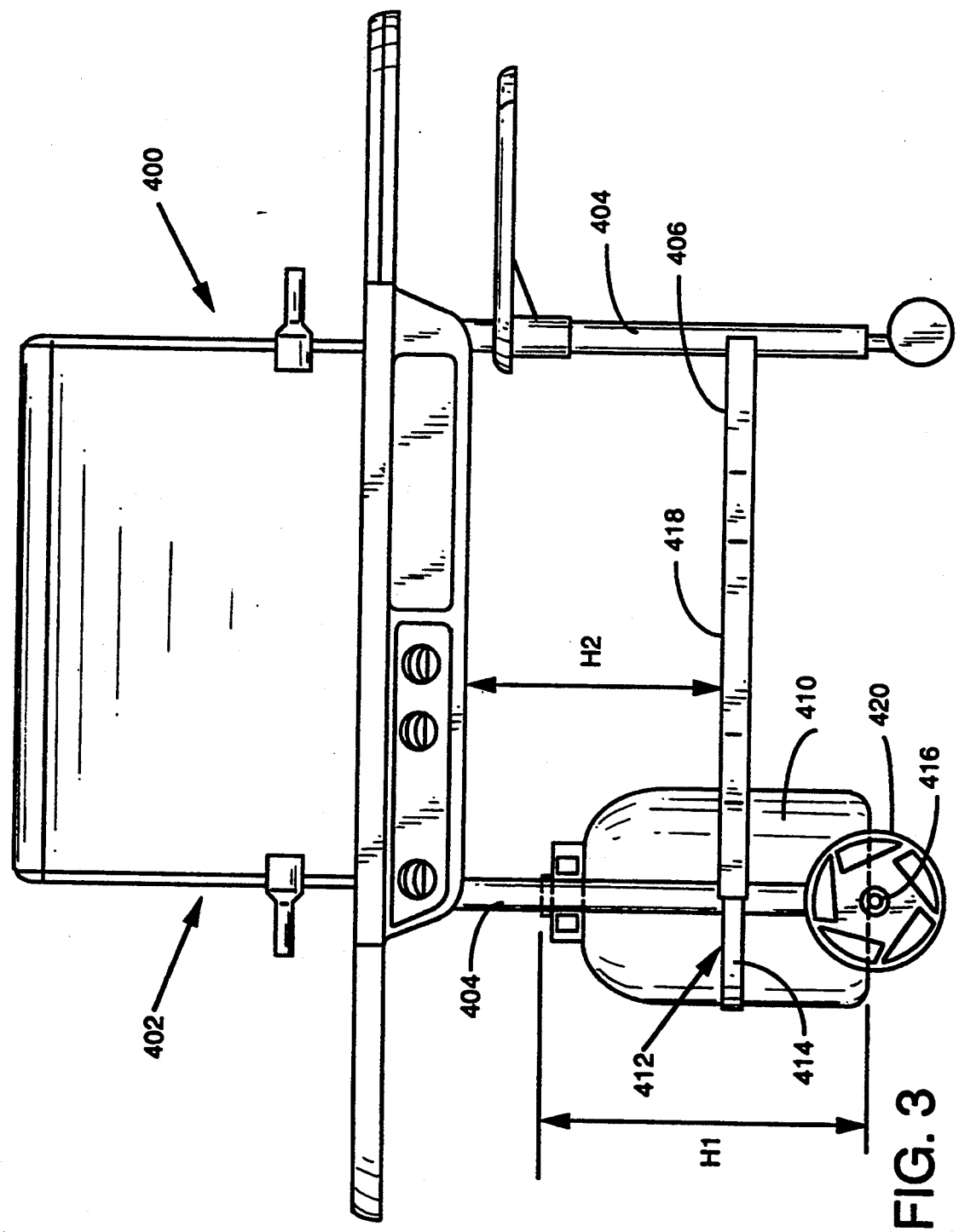
FIG. 3 is an elevational view of a grill illustrating a highly preferred embodiment of the invention.

As further illustrated in FIGS. 1–3, the grill 400 includes a lower shelf member 406 positioned generally between the legs 404, and preferably fastened to the legs 404, for example, by bolts or screws or other fasteners known to those of ordinary skill in the art. As further illustrated in FIGS. 1–3, the lower shelf 406 has a cutout portion 408 sized and shaped for receiving a gas tank 410 to be mounted to the grill 400 for use therewith. The gas tank 410, as shown in FIG. 3, has a vertical height H1 greater than the distance H2 that the upper surface 418 of the lower shelf member 406 is spaced from the underside of the upper grilling portion 402. By providing a grill 400 having a dimension H2 which, when measured from the upper surface 418 of the lower shelf member 406 to the uppermost point 402a of the lower surface of the upper grilling portion 402, is less than the vertical height H1 of the gas tank 410, the gas tank 410 is precluded from being placed on the lower shelf 406 in a vertical orientation. This, in turn, prevents the user of the grill 400 from storing extra gas tanks 410 underneath the grilling portion 402 of the grill 400, creating a potential fire hazard.

As further illustrated in FIGS. 2 and 3, the grill 400 further includes a retaining device, generally 412, for retaining the gas tank 410 in a recessed storage position with respect to the shelf member 406 and within the cutout portion 408 of the shelf member 406.

In a preferred embodiment of the invention, the retaining device 412 comprises a strap 414 which may be a metal band, chain, a fire resistent flexible material such as a fire resistent plastic, or other retaining mechanism. As illustrated in FIG. 1, the strap 414 is fastened on either end to the shelf 406, thereby retaining the gas tank 410 within the cutout portion 408 of the shelf 406.

In a most highly preferred embodiment of the invention, the gas tank 410 is retained in its recessed position above the ground, by resting on a rod traversing the cutout portion 408 of the shelf member 406 below the upper surface 418 of the shelf 406. This may be accomplished, for example, by placing a rod through two of the legs 404 at a location below the shelf 406 as illustrated in FIGS. 2 and 3.

In a most highly preferred embodiment of the invention, the rod 416 comprises an axle having a wheel 420 on either end thereof.

Preferably, the strap 414 is flexible enough to permit installation and removal thereof. The strap 414 illustrated in FIG. 2 is attached on either end to the shelf 406, although it would be equally possible to attach the strap to the legs 404 on either side of the gas tank 410. In a highly preferred embodiment of the invention, the strap 414 is fastened to the grill on only one end of the strap, the other end of the strap including a connect/disconnect device, such as snap, hook, clasp, or other such device, known to those of ordinary skill in the art, in this case for connecting and disconnecting the end of the strap 414 from the grill 400 for removing and replacing the gas tank 410.

Figure 4:
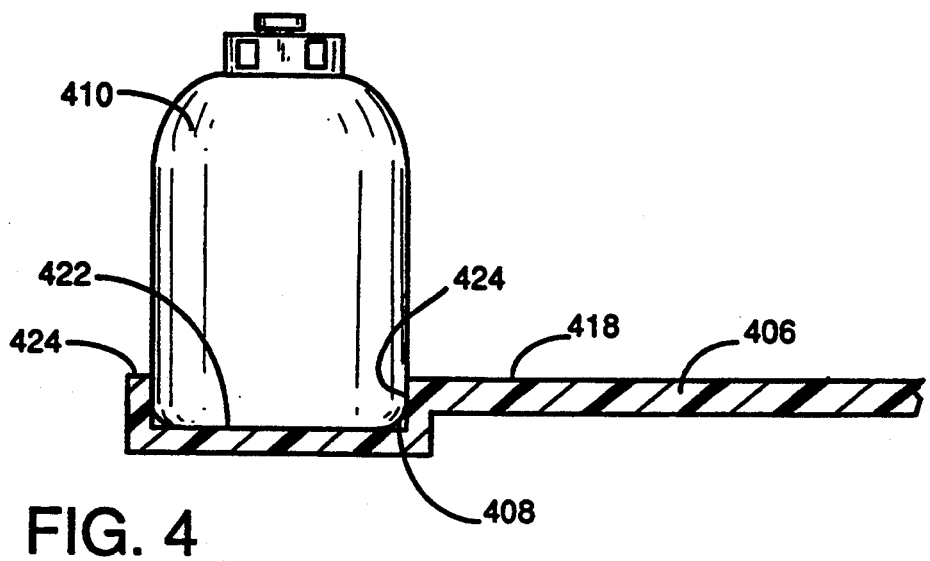
FIG. 4 is an elevational schematic illustration of another preferred embodiment of the invention.
Figure 5:
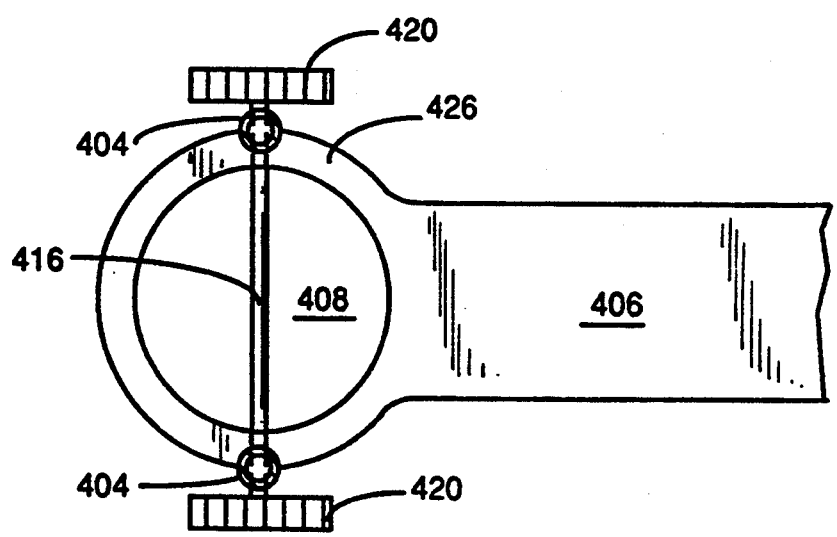
FIG. 5 is a schematic top plan view of another preferred embodiment of the present invention.

Alternative embodiments of the present invention are illustrated in FIGS. 4 and 5. In the embodiment of FIG. 4, the shelf 406 has a cutout portion 408 comprising a recess in the shelf, creating a shelf surface 422 that is stepped down from the primary shelf surface 418, thereby creating the necessary recess for lowering the top of the gas tank 410 below the lowermost section of the upper grilling portion 402 similar to that illustrated in FIG. 3. The stepped down section 422 includes sidewalls 424 which assist in retaining the gas tank 410 in its desired position with respect to the grill 400. In the embodiment of FIG. 4, the recessed portion 422 in combination with the sidewalls 424 functions as both as a cutout portion for recessing the gas tank 410 and a retaining device for retaining the gas tank in its recessed position with respect to the grill 400.

FIG. 5 illustrates another preferred embodiment of the invention, wherein the cutout portion 408 of the shelf 406 comprises an opening through the shelf 406 bounded completely by the shelf, in this case by a ring portion 426. In this embodiment, the gas tank 410 could either rest directly on the ground or, most preferably, would rest on the rod or axle 416 substantially as previously described.

While the specific embodiments disclosed herein have been illustrated and described, numerous modifications to those embodiments will now be readily apparent to those of ordinary skill in the art. Such modifications, while not significantly departing from the spirit and scope of the invention, are intended to be embraced within the scope of protection of the following claims, including all equivalents thereof. Additionally, the present invention has been described above in terms of representative embodiments which are illustrative, but not intended to be self-limiting. Furthermore, while many objects and advantages of the invention have been set forth, it is understood and intended that the invention is defined by the scope of the following claims, and not by the objects and advantages.

We claim:

1. A gas barbecue grill comprising an upper grilling portion supported by three or more legs, said legs having positioned generally between them a lower shelf member spaced a predetermined distance from said upper grilling portion, said lower shelf member having a cutout portion sized and shaped for receiving a gas tank to be mounted to said grill for use therewith, said gas tank having a vertical height greater than said predetermined distance, thereby precluding said gas tank from being placed on said shelf member in a vertical orientation, said grill further including retaining means for retaining said gas tank in a recessed storage position with respect to said shelf member and within said cutout portion of said shelf member.

2. The gas barbecue grill of claim 1 wherein said retaining means comprises strap means fastened to said grill and holding said gas tank in proximity to said shelf member.

3. The gas barbecue grill of claim 2 wherein said retaining means further includes a rod upon which said gas tank rests in said recessed storage position, said rod traversing said cutout portion of said shelf member below the upper surface of said shelf member.

4. The gas barbecue grill of claim 3 wherein said rod comprises an axle having a wheel on either end thereof.

5. The gas barbecue grill of claim 1 wherein said cutout portion of said shelf comprises an opening through said shelf bounded completely by said shelf.

6. The gas barbecue grill of claim 1 wherein said cutout portion of said shelf comprises a recess in said shelf.

7. The gas barbecue grill of claim 2 wherein said strap means is fastened to said shelf member.

8. The gas barbecue grill of claim 2 wherein said strap means is fastened to two said legs, and said legs are on opposite sides of said cutout portion.

9. The gas barbecue grill of claim 2 wherein at least one end of said strap means includes means for connecting and disconnecting said end of said strap from said grill.

* * * * *